UNITED STATES PATENT OFFICE.

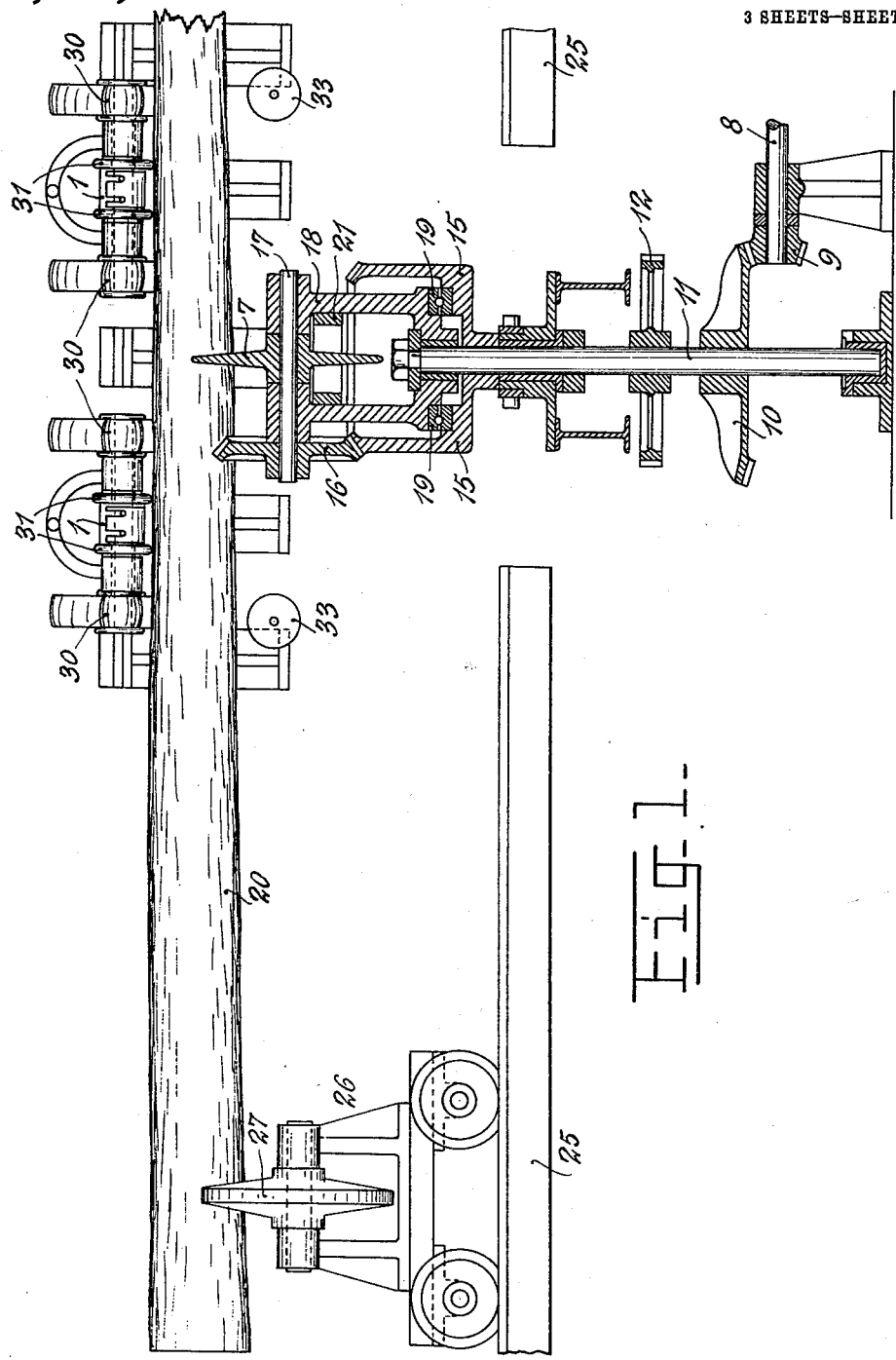

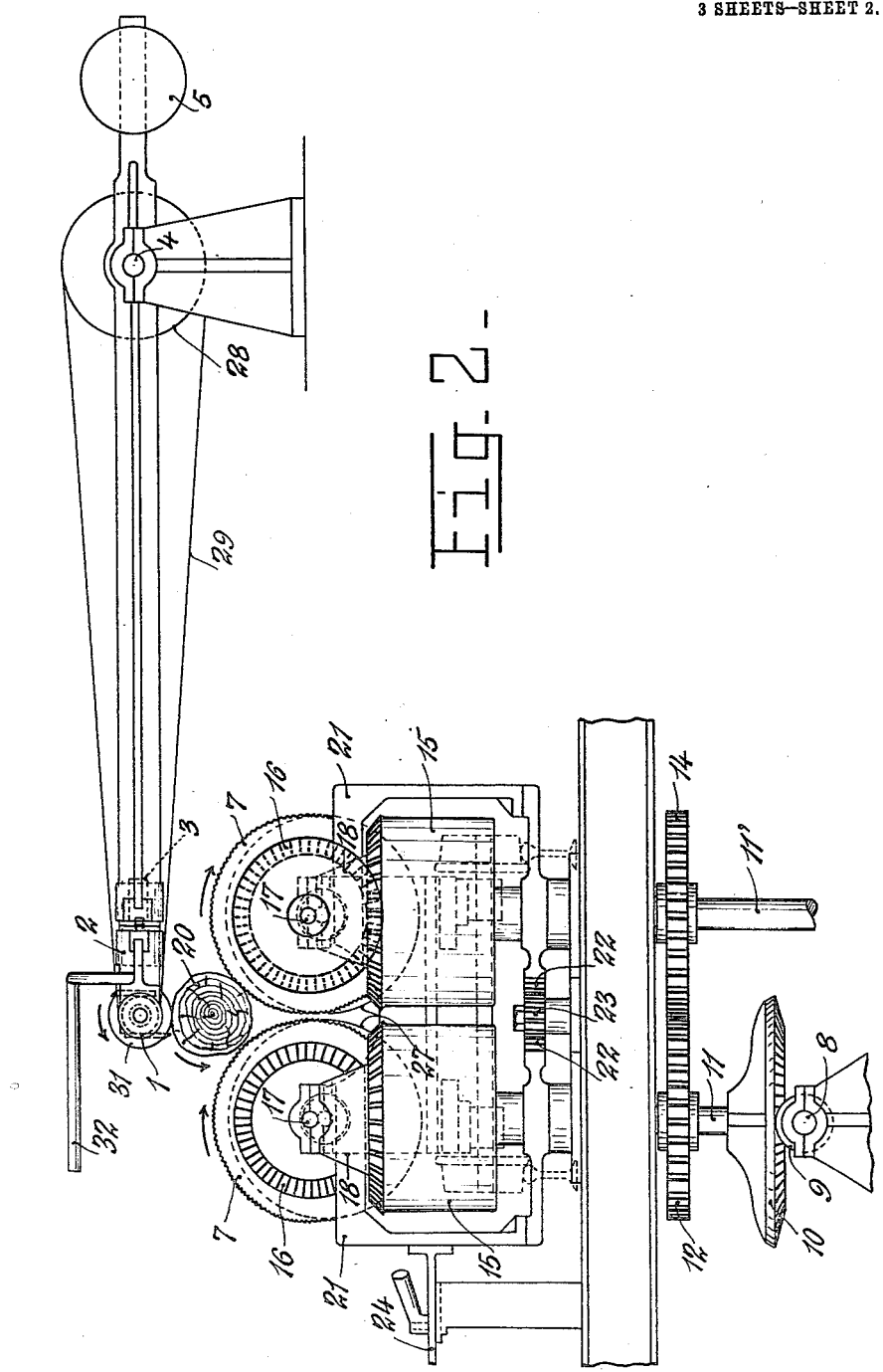

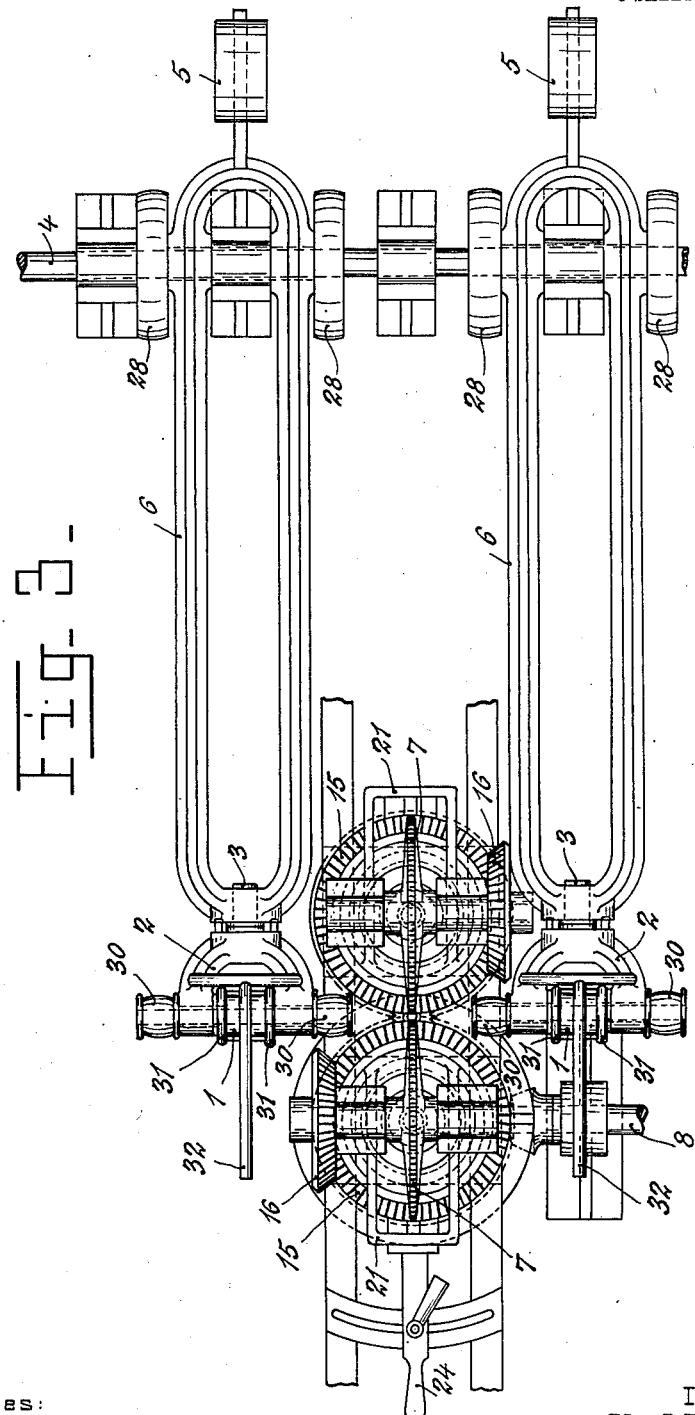

OLAF EIDSÆTHER, OF MJÖNDALEN, NORWAY.

LOG-PEELING MACHINE.

1,090,463.

Specification of Letters Patent.

Patented Mar. 17, 1914.

Application filed October 24, 1912. Serial No. 727,549.

*To all whom it may concern:*

Be it known that I, OLAF EIDSÆTHER, engineer, a subject of Norway, and resident of Mjöndalen, Buskerud, Kingdom of Norway, have invented a certain new and useful Log-Peeling Machine, of which the following is a specification.

The present invention relates to a machine for peeling bark from logs and the like, in which the entire log is automatically stripped of its bark by passing through the machine under the influence of rotary cutters.

The object of the invention is to provide a machine which will be simple in operation and require a minimum of labor. To this end I have provided a single pair of log supporting and feeding disks rotatable in planes in parallel relation to each other with an operation connection between them for holding them in said parallel relation and for so turning the disks that the planes of the same turn upon vertical axes, whereby it is possible to rapidly and safely regulate the log feeding velocity and even to reverse the feeding direction.

The invention is illustrated in the accompanying drawings in which—

Figure 1 is a longitudinal sectional elevation of a machine suitable for carrying out the process. Fig. 2 is an end view of the same, and Fig. 3 a plan view corresponding to Fig. 2.

Each of the shafts of two rotating cutters —1— is journaled in a bifurcated member —2— mounted to rotate about a pivot —3— which is in turn inserted into the end of a frame —6— mounted to turn on the main driving shaft —4— and suitably balanced by means of an adjustable counter-weight —5—. Between these two frames is disposed a pair of disks —7— which are provided along their circumference with points or teeth and which are both driven in the same direction from a main shaft —8— (Fig. 1) through the following parts: a pair of bevel-wheels —9, 10— the vertical shaft —11—, the cylindrical gears —12, 14— (Fig. 2), the vertical shaft —11'—, the bevel-wheels —15— and —16— and the shafts —17— of the disks —7—. Between the bearing frame —18— of these shafts and the gears —15— which are keyed on the shafts —11, 11'—, is interposed a ball bearing —19— which takes up the weight of the log —20— when the latter rests on both disks —7— as indicated in Fig. 2. To the bearings —18— of the disks —7— is attached a bail —21— extending below the gear —15— where it is provided with a toothed sector —22— gearing through a fixed spur-wheel —23— with the corresponding sector —22— on the bail —21— of the other disk —7—, so that on turning a hand lever —24— secured to one of the bails —21— and adapted to be clamped to an arc-shaped member, both bearings —18— or disks —7—, respectively, will assume an inclined position with both disks in planes parallel to each other. The log —20—, moreover, rests on supporting disks —27— of one or the other of two carriages —26— movable on rails —25— (Fig. 1), so that the log will occupy a substantially horizontal position.

Each cutter —1—, the shaft of which is driven from the main shaft —4— through a double belt-transmission —28, 29, 30— is provided at each end with disks —31— loosely rotatable on the cutter-shaft and serving to regulate the cutting depth of the cutters. By means of a handle —32— on the free end of the frame —6— the pressure of the cutters against the log may moreover be regulated by hand, and by turning the bifurcated member —2— on the pin —3—, the cutter can be so adjusted as to lie parallel to the surface direction of the log. This adjustment, however, generally takes place automatically.

Fixed rollers —33— (Fig. 1) serve to support the end of the log before it is supported by the disks —27— of the carriages —26—.

After the disks —7— have been brought into a suitably inclined position by means of the lever —24—, and one end of the log —20— has been placed on one of the rollers —33— while its other end rests on the supporting disk —27— on the carriage —26— in question, the end of the log is moved below the first cutter —1— to its seat between the feed disks —7—. During the rotation of the latter the log will not only be turned but will also receive a slow longitudinal motion the velocity of which depends on the degree of inclination of the disks —7—. Thus the log while being rotated will move slowly below the cutters —1—, its bark being thereby peeled off in an easy and safe manner, the cutters riding on the surface of the log and their cutting depth being regulated by the loose disks —30—.

When the point of gravity of the log has passed the disks —7—, the log will tilt so that one of its ends will be raised from the first supporting disks —27— and its other end be lowered onto the disks —27— of the carriage in front which latter disks will now support the log in conjunction with the feed disks —7—. This is necessary to prevent the log from having at any time more than two points of support which is insured by the fact that the disks —27— are located a little lower than the disks —7—. Thereby also crooked logs can pass through the machine.

Having described my invention, what I claim as new and desire to secure by Letters Patent is:—

1. In a machine for peeling logs and the like, the combination of a single pair of feeding disks rotatable in planes in parallel relation to each other, and adapted to feed and support a log; means for rotating disks; an operative connection between the disks for holding them in said parallel relation and turning the disks so that the planes of the disks turn upon axes; and a bark-peeling device associated with the disks.

2. In a machine for peeling logs and the like, the combination of a single pair of feeding disks rotatable in planes in parallel relation to each other, and adapted to feed and support a log; means for rotating disks; an operative connection between the disks for holding them in said parallel relation and turning the disks so that the planes of the disks turn upon axes; a bark-peeling device associated with the disks; a carriage movable in the direction of the log; and a pair of supporting disks mounted on said carriage.

3. In a machine for peeling logs and the like, the combination of a single pair of supporting means each adapted to turn on a substantially vertical axis; a serrated disk mounted on each supporting means and to rotate thereon on a horizontal axis; means for rotating the disks in the same direction; an operative connection between said supporting means for turning the latter together and holding said disks parallel to each other; and a bark-peeling device associated with said disks.

4. In a machine for peeling logs and the like, the combination of a single pair of supporting means each adapted to turn on a substantially vertical axis; a serrated disk mounted on each supporting means and to rotate thereon on a horizontal axis; means for rotating the disks in the same direction; a toothed sector on each of said supporting means; a gear intermeshing with both sectors; and a bark-peeling device associated with the disks.

5. In a machine for peeling logs and the like, the combination of a single pair of supporting means each adapted to turn on a substantially vertical axis; a serrated disk mounted on each supporting means and to rotate thereon on a horizontal axis; means for rotating the disks in the same direction; a toothed sector on each of said supporting means; a gear intermeshing with both sectors; a bark-peeling device associated with the disks; and a handle lever connected to one of the supports.

Signed at Christiania, Norway, this fifth day of October A. D. 1912.

OLAF EIDSÆTHER.

Witnesses:
AXEL LAHN,
MAGNUS BUGGE.